United States Patent
Schuetz et al.

(10) Patent No.: US 7,819,382 B2
(45) Date of Patent: Oct. 26, 2010

(54) TEMPERATURE AND PRESSURE RESPONSIVE SEAL

(75) Inventors: Thorsten Schuetz, Selzen (DE);
Markus Lindner, Mainz (DE);
Wolfgang Oelerich, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/117,858

(22) Filed: May 9, 2008

(65) Prior Publication Data
US 2009/0278322 A1 Nov. 12, 2009

(51) Int. Cl.
*F16K 51/00* (2006.01)
(52) U.S. Cl. ............... 251/144; 251/148; 251/214; 277/582
(58) Field of Classification Search ........... 251/148, 251/214; 277/579, 580, 582, 929, 931, 609, 277/630, 643; 220/581, 582, 203.01, 239, 220/240, 203.08, 201, 221, 222
See application file for complete search history.

(56) References Cited

U.S. PATENT DOCUMENTS

| | | | | |
|---|---|---|---|---|
| 1,603,903 A | * | 10/1926 | Church | 220/240 |
| 1,796,724 A | * | 3/1931 | Rigby | 277/330 |
| 2,016,226 A | * | 10/1935 | Clausen | 220/240 |
| 3,648,893 A | * | 3/1972 | Whiting | 222/3 |
| 5,922,766 A | | 7/1999 | Acosta et al. | |
| 5,927,726 A | * | 7/1999 | Achenbach et al. | 277/609 |
| 2007/0012551 A1 | * | 1/2007 | Rohwer et al. | 200/61.22 |

FOREIGN PATENT DOCUMENTS

| | | |
|---|---|---|
| DE | 44 13 863 C2 | 3/1996 |
| EP | 0 836 676 B1 | 7/1996 |

* cited by examiner

*Primary Examiner*—John K Fristoe, Jr.
*Assistant Examiner*—Marina Tietjen
(74) *Attorney, Agent, or Firm*—Fraser Clemens Martin & Miller LLC; J. Douglas Miller

(57) ABSTRACT

A seal for a vessel is disclosed which militates against a leakage of fluid during expansion and contraction of the vessel due to changes pressure and temperature. Inner sealing surfaces of the seal form substantially fluid-tight seals in response to at least one of temperatures below a predetermined temperature and pressures below a predetermined pressure and outer sealing surfaces of the seal form substantially fluid-tight seals in response to at least one of temperatures above the predetermined temperature and pressures above the predetermined pressure.

18 Claims, 2 Drawing Sheets

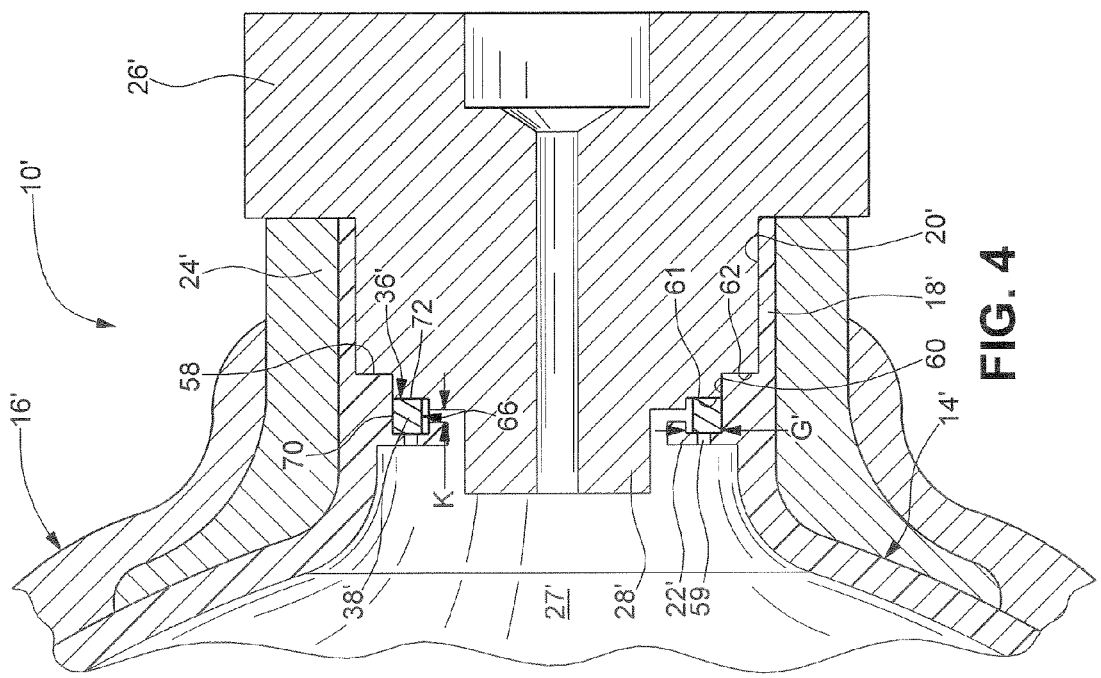
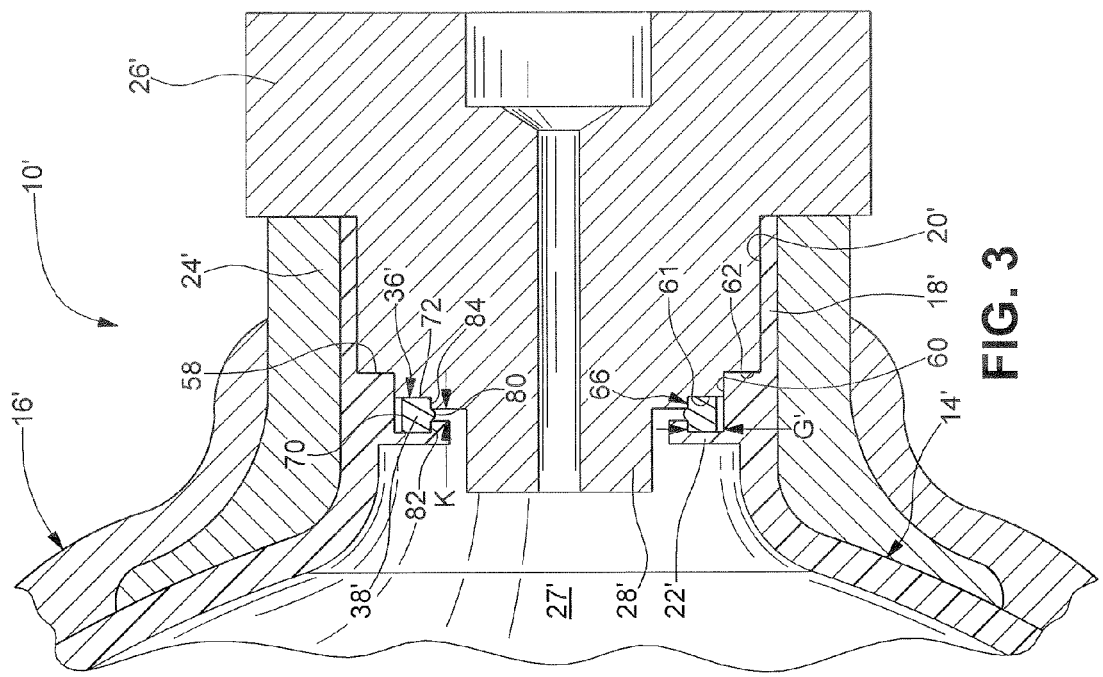

TEMPERATURE AND PRESSURE RESPONSIVE SEAL

FIELD OF THE INVENTION

The invention relates to a vessel for storing a fluid. More particularly, the invention is directed to a seal disposed in the vessel to militate against a leakage of the fluid therefrom due to expansion and contraction caused by changes in temperature and pressure.

BACKGROUND SUMMARY

Presently there are a variety of pressure vessels developed for use in various applications, such as those designed to contain gases for use in fuel cells. Fuel cells have been proposed as a clean, efficient and environmentally responsible power source for electric vehicles and various other applications. One example of a fuel cell is a Proton Exchange Membrane (PEM) fuel cell. In the PEM type fuel cells, hydrogen is supplied as a fuel to an anode of the fuel cell and oxygen is supplied as an oxidant to a cathode of the fuel cell. Hydrogen is colorless, odorless, burns without producing a visible flame or radiant heat, and is difficult to contain. A common technique for storing hydrogen is in a lightweight, high pressure vessel resistant to punctures.

Traditionally such vessels are divided into four types. A Type I vessel is a metal vessel. A Type II vessel is also a metal vessel, the vessel having an outer composite shell disposed on a cylindrical section thereof. A Type III vessel consists of a liner produced from a metal such as steel and aluminum, for example, and an outer composite shell that encompasses the liner and militates against damage thereto. A Type IV vessel is substantially similar to the Type III vessel, wherein the liner is produced from a plastic. Furthermore, a conceptual Type V vessel may be developed, wherein the vessel is produced from a composite material. Each type of vessel may include at least one boss disposed therein to receive a valve.

Typically, the valve disposed in the boss includes a valve housing having an external groove terminating in an annular flange. The flange is formed on the valve housing adjacent the groove to abut the vessel. An O-ring having an inner surface and an outer surface is seated in the groove of the valve housing to militate against a leakage of fluid from the vessel. The inner surface of the O-ring is adapted to abut the groove to form a substantially fluid-tight seal therebetween. The outer surface is adapted to abut the liner to form a substantially fluid-tight seal therebetween. During operation, an interior of the vessel is subjected to temperatures below a predetermined temperature such as during defueling, for example. The temperatures below the predetermined temperature cause the O-ring to contract radially inwardly onto the valve housing. Accordingly, a passage is formed between the outer surface of the O-ring and the liner, causing the leakage of fluid therethrough.

It would be desirable to produce a seal to militate against a leakage of fluid due to thermal expansion and contraction, wherein the cost thereof is minimized and the durability and reliability thereof are maximized.

SUMMARY OF THE INVENTION

In concordance and agreement with the present invention, a seal to militate against a leakage of fluid due to thermal expansion and contraction, wherein the cost thereof is minimized and the durability and reliability thereof are maximized, has surprisingly been discovered.

In one embodiment, the seal comprises a substantially ring-shaped main body having a first inner sealing surface, a second inner sealing surface, a first outer sealing surface, and a second outer sealing surface; and a lip formed on the main body extending radially inwardly to separate the first inner sealing surface and the second inner sealing surface.

In another embodiment, the sealing system comprises a male member disposed in a female member, the female member including an annular shoulder formed on an inner surface thereof; and a seal disposed between the male member and the female member, the seal further comprising: a substantially ring-shaped main body having a first inner sealing surface and a second inner sealing surface, wherein the inner sealing surfaces form a substantially fluid-tight seal in response to at least one of temperatures below a predetermined temperature and pressures below a predetermined pressure, the main body further including a first outer sealing surface and a second outer sealing surface, wherein the outer sealing surfaces form a substantially fluid-tight seal in response to at least one of temperatures above the predetermined temperature and pressures above the predetermined pressure.

In another embodiment, the sealing system comprises a female member including an annular shoulder formed on an inner surface thereof; a male member disposed in the female member; and a seal disposed in the annular shoulder of the female member between the female member and the male member, the seal further comprising: a substantially ring-shaped main body including a first inner sealing surface and a second inner sealing surface, wherein the first inner sealing surface is adapted to abut the annular shoulder of the female member in response to at least one of temperatures below a predetermined temperature and pressures below a predetermined pressure to form a substantially fluid-tight seal therebetween and the second inner sealing surface is adapted to abut the male member in response to at least one of temperatures below the predetermined temperature and pressures below the predetermined pressure to form a substantially fluid-tight seal therebetween, the main body further including a first outer sealing surface and a second outer sealing surface, wherein the first outer sealing surface is adapted to abut the inner surface of the female member in response to at least one of temperatures above the predetermined temperature and pressures above the predetermined pressure to form a substantially fluid-tight seal therebetween and the second outer sealing surface is adapted to abut the male member in response to at least one of temperatures above the predetermined temperature and pressures above the predetermined pressure to form a substantially fluid-tight seal therebetween.

DESCRIPTION OF THE DRAWINGS

The above features of the invention will become readily apparent to those skilled in the art from reading the following detailed description of the invention when considered in the light of the accompanying drawings, in which:

FIG. 3 is a fragmentary sectional view of a pressure vessel including a valve and a seal according to another embodiment of the invention, wherein inner sealing surfaces form substantially fluid-tight seals; and FIG. 4 is a fragmentary sectional view of the pressure vessel illustrated in FIG. 3, wherein outer sealing surfaces of the seal form substantially fluid-tight seals.

DETAILED DESCRIPTION OF THE PREFERRED EMBODIMENT

The following detailed description and appended drawings describe and illustrate an embodiment of the invention. The description and drawings serve to enable one skilled in the art to make and use the invention, and are not intended to limit the scope of the invention in any manner.

Figure 1:
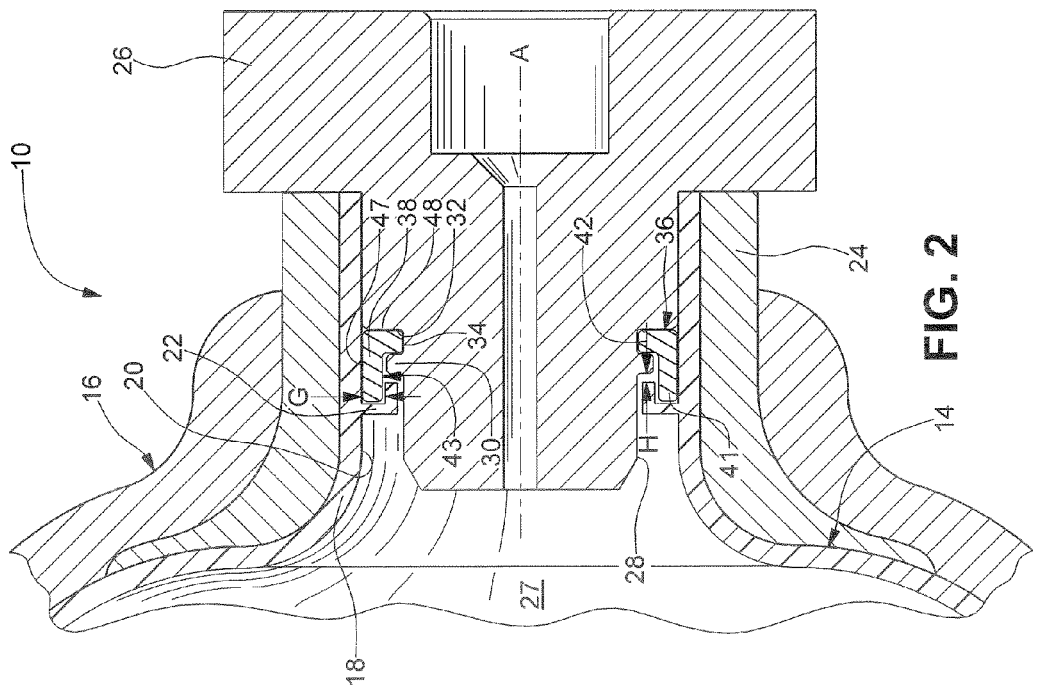
FIG. 1 is a fragmentary sectional view of a pressure vessel including a valve and a seal according to an embodiment of the invention, wherein inner sealing surfaces of the seal form substantially fluid-tight seals.
Figure 2:
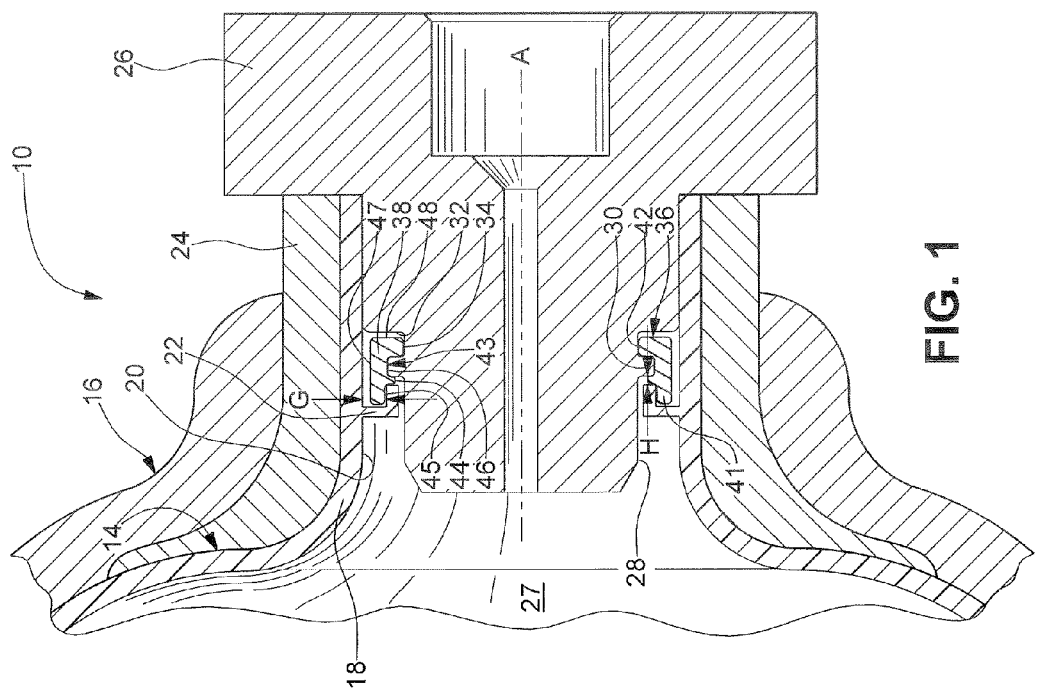
FIG. 2 is a fragmentary sectional view of the pressure vessel illustrated in FIG. 1, wherein outer sealing surfaces of the seal form substantially fluid-tight seals.

FIGS. 1 and 2 show a sealing system for a Type IV pressure vessel 10 according to an embodiment of the invention. It is understood that the sealing system can be used with other vessel types such as a Type II and a Type V, for example. A wall forming the vessel 10 includes a liner 14 to contain a pressurized fluid (not shown) and an outer composite shell 16. The liner 14 includes a neck portion 18 having an inner surface 20 formed thereon. Additional neck portions can be formed on the liner 14 if desired. An annular shoulder 22 extending radially inwardly is formed on the neck portion 18. In the embodiment shown, the shoulder 22 has a substantially L-shaped cross-section, although other shapes can be used if desired. The liner 14 can be produced from any conventional material such as a plastic, for example.

The vessel 10 is provided with at least one boss 24 for receiving a valve 26 therein. The outer composite shell 16 encompasses the liner 14 and the at least one boss 24 to militate against damage thereto. In the embodiment shown, the valve 26 is in fluid communication with an interior 27 of the vessel 10 and a fuel cell system (not shown). The valve 26 includes a generally cylindrical male portion 28. The male portion 28 includes a radially outwardly extending flange 30 and a wall 32 spaced apart from the flange 30 forming a channel 34 therebetween. Although the valve 26 in the embodiment shown is produce from a metal material, it is understood that any conventional material can be used as desired.

The vessel 10 includes a seal 36. The seal 36 is disposed between a male member and a female member of the vessel 10. In the embodiment shown, the male member is the male portion 28 of the valve 26 and the female member is the neck portion 18 of the liner 14. The seal 36 cooperates with the annular shoulder 22, the flange 30, and the wall 32 of the valve 26 to militate against a leakage of the fluid from the vessel 10 when subjected to at least one of temperatures above and below a predetermined temperature and pressures above and below a predetermined pressure. In the embodiment shown, the predetermined temperature is in a range of −85 degrees Celsius to 85 degrees Celsius and the predetermined pressure ranges from a minimum service pressure to a proof pressure including a burst pressure. It is understood that the predetermined temperature can be any temperature as desired and the predetermined pressure can be any pressure as desired.

The seal 36 includes a substantially ring-shaped main body 38. In the embodiment shown, the main body 38 is generally L-shaped in cross-section, although the main body 38 can have other cross-sectional shapes as desired. A first end 41 of the main body 38 extends substantially parallel to a longitudinal axis A of the valve 26. A second end 42 of the main body 38 extends radially inwardly. The first end 41 is adapted to be received in a gap G of the annular shoulder 22 of the at least one neck portion 18 of the liner 14. The second end 42 is adapted to be received in the channel 34 of the valve 26. In the embodiment shown, the seal 36 is produced from an elastomer material such as rubber, for example, wherein the material has a coefficient of thermal expansion greater than a coefficient of thermal expansion of the materials used to produce the liner 14 and the valve 26. It is understood that other materials capable of sealing at temperatures above and below the predetermined temperature and pressures above and below the predetermined pressure may be used to produce the seal 36 as desired.

The main body 38 includes an inner surface 43 formed adjacent the first end 41 of the main body 38. As illustrated in FIG. 1, a lip 44 is caused to extend radially inwardly from the inner surface 43 of the main body 38 when the interior 27 of the vessel 10 is subjected to at least one of temperatures below the predetermined temperature and pressures below the predetermined pressure. The lip 44 extends intermediate the first end 41 and the second end 42 of the main body 38 into a gap H formed between the annular shoulder 22 and the flange 30 of the valve 26. The lip 44 separates a first inner sealing surface 45 from a second inner sealing surface 46. The first inner sealing surface 45 is adapted to abut the annular shoulder 22 in response to at least one of temperatures below the predetermined temperature and pressures below the predetermined pressure to form a substantially fluid-tight seal therebetween. The second inner sealing surface 46 is adapted to abut the flange 30 of the valve 26 in response to at least one of temperatures below the predetermined temperature and pressures below the predetermined pressure to form a substantially fluid-tight seal therebetween.

The main body 38 also includes a first outer sealing surface 47 and a second outer sealing surface 48. In the embodiment shown, the first outer sealing surface 47 is formed on an outer circumference of the main body 38. The second outer sealing surface 48 is formed on the second end 42 of the main body 38. As illustrated in FIG. 2, the first outer sealing surface 47 is adapted to abut the inner surface 20 of the liner 14 in response to at least one of temperatures above the predetermined temperature and pressures above the predetermined pressure to form a substantially fluid-tight seal therebetween. The second outer sealing surface 48 is adapted to abut the wall 32 of the valve 26 in response to at least one of temperatures above the predetermined temperature and pressures above the predetermined pressure to form a substantially fluid-tight seal therebetween. It is understood that the main body 38 may include other sealing surfaces as desired.

FIGS. 1 and 2 illustrate the seal 36 in use. In the embodiment shown, the at least one neck portion 18 is produced from high-density polyethylene (HDPE) having a coefficient of thermal expansion greater than a coefficient of thermal expansion of the valve 26. The seal 36 is produced from an elastomer material having a coefficient of thermal expansion greater than the at least one neck portion 18 and the valve 26. Accordingly, when the interior 27 of the pressure vessel 10 is subjected to at least one of temperatures below the predetermined temperature and pressures below the predetermined pressure as shown in FIG. 1, the seal 36 is caused to contract more than the liner 14 and the valve 26. The contraction of the seal 36 causes the inner surface 43 to abut the annular shoulder 22 and the flange 30 of the valve 26, causing the lip 44 to extend therebetween and into the gap H. Therefore, the first inner sealing surface 45 sealingly abuts the annular shoulder 22 of the liner 14 and the second inner sealing surface 46 sealingly abuts the flange 30 of the valve 26 militating against the leakage of fluid from the pressure vessel 10.

When the interior 27 of the pressure vessel 10 is subjected to temperatures above the predetermined temperature and pressures above the predetermined pressure as shown in FIG. 2 the seal 36 is caused to expand more than the liner 14 and the valve 26. Thus the expansion of the seal 36 causes the first outer sealing surface 47 to sealingly abut the inner surface 20 of the liner 14 and the second outer sealing surface 48 to sealingly abut the wall 32 of the valve 26 militating against the leakage of fluid from the pressure vessel 10.

FIGS. 3 and 4 show another embodiment of the invention which includes a sealing system similar to that shown in FIGS. 1 and 2. Reference numerals for similar structure in respect of the description of FIGS. 1 and 2 are repeated in FIGS. 3 and 4 with a prime (') symbol. Although the sealing system shown is for a Type IV pressure vessel 10', it is understood that the sealing system can be used with other vessel types such as a Type III and a Type V, for example.

A wall forming the vessel 10 includes a liner 14 to contain a pressurized fluid (not shown) and an outer composite shell 16'. The liner 14' includes a neck portion 18' having an inner surface 20' formed thereon. Additional neck portions can be formed on the liner 14' if desired. The liner 14' can be produced from any conventional material such as a plastic, for example. A first annular shoulder 22' and a second annular shoulder 58 extending radially inwardly are formed on the inner surface 20' of neck portion 18'. In the embodiment shown, the first annular shoulder 22' has a substantially L-shaped cross-section. It is understood that the first annular shoulder 22' can have other shapes as desired such as having a arcuate portion extending radially inwardly into an interior 27' of the vessel 10', for example. An annular array of bores 59, as shown in FIG. 4, can be formed in the first annular shoulder 22' of the liner 14', if desired. The bores 59 are adapted to permit additional pressure from the interior 27' of the vessel 10' to be exerted on a seal 36'. The second annular shoulder 58 includes an inner surface 60. It is understood that the inner surface 60 can slope inwardly from a valve 26' to the first annular shoulder 22', if desired.

The vessel 10' is provided with at least one boss 24' for receiving the valve 26' therein. The outer composite shell 16' encompasses the liner 14' and the at least one boss 24' to militate against damage thereto. In the embodiment shown, the valve 26' is in fluid communication with the interior 27' of the vessel 10' and a fuel cell system (not shown). The valve 26' includes a generally cylindrical male portion 28'. The male portion 28' includes a first annular shoulder 61 and a second annular shoulder 62. The first annular shoulder 61 is adapted to abut the seal 36'. The second annular shoulder 62 is adapted to abut the second annular shoulder 58 of the liner 14'. Although the valve 26' in the embodiment shown is produced from a metal material, it is understood that any conventional material can be used as desired.

The seal 36' is disposed between a male member and a female member of the vessel 10'. In the embodiment shown, the male member is the male portion 28' of the valve 26' and the female member is the neck portion 18' of the liner 14'. The seal 36' cooperates with the annular shoulder 22' and the first annular shoulder 61 of the valve 26' to militate against a leakage of the fluid from the vessel 10' when subjected to at least one of temperatures above and below a predetermined temperature and pressures above and below a predetermined pressure. In the embodiment shown, the predetermined temperature is in a range of −85 degrees Celsius to 85 degrees Celsius and the predetermined pressure ranges from a minimum service pressure to a proof pressure including a burst pressure. It is understood that the predetermined temperature can be any temperature as desired and the predetermined pressure can be any pressure as desired.

The seal 36' includes a substantially ring-shaped main body 38'. In the embodiment shown, the main body 38' is generally rectangular in cross-section, although the main body 38' can have other cross-sectional shapes as desired. The main body 38' is adapted to be received in a gap G' of the first annular shoulder 22' of the at least one neck portion 18' of the liner 14'. In the embodiment shown, the seal 36' is produced from an elastomer material such as rubber, for example, wherein the material has a coefficient of thermal expansion greater than a coefficient of thermal expansion of the materials used to produce the liner 14' and the valve 26'. It is understood that other materials capable of sealing at temperatures above and below the predetermined temperature and pressures above and below the predetermined pressure may be used to produce the seal 36' as desired.

The main body 38' includes an inner surface 66. As illustrated in FIG. 3, a lip 80 is caused to extend radially inwardly from the inner surface 66 of the main body 38' when the interior 27' of the vessel 10' is subjected to at least one of temperatures below the predetermined temperature and pressures below the predetermined pressure. The lip 80 extends into a gap K formed between the first annular shoulder 22' of the liner 14' and the first annular shoulder 61 of the valve 26'. The lip 80 separates a first inner sealing surface 82 from a second inner sealing surface 84. The first inner sealing surface 82 is adapted to abut the annular shoulder 22' of the liner 14' in response to at least one of temperatures below the predetermined temperature and pressures below the predetermined pressure to form a substantially fluid-tight seal therebetween. The second inner sealing surface 84 is adapted to abut the annular shoulder 61 of the valve 26' in response to at least one of temperatures below the predetermined temperature and pressures below the predetermined pressure to form a substantially fluid-tight seal therebetween.

The main body 38' also includes a first outer sealing surface 70 and a second outer sealing surface 72. In the embodiment shown, the first outer sealing surface 70 is formed on an outer circumference of the main body 38'. The second outer sealing surface 72 is formed adjacent the first outer sealing surface 70 and the inner surface 66 of the main body 38'. As illustrated in FIG. 4, the first outer sealing surface 70 is adapted to abut the inner surface 60 of the first annular shoulder 58 of the liner 14' in response to at least one of temperatures above the predetermined temperature and pressures above the predetermined pressure to form a substantially fluid-tight seal therebetween. The second outer sealing surface 72 is adapted to abut the first annular shoulder 61 of the valve 26' in response to at least one of temperatures above the predetermined temperature and pressures above the predetermined pressure to form a substantially fluid-tight seal therebetween. It is understood that the main body 38' may include other sealing surfaces as desired.

FIGS. 3 and 4 illustrate the seal 36' in use. In the embodiment shown, the at least one neck portion 18' is produced from high density polyethylene (HDPE) having a coefficient of thermal expansion greater than a coefficient of thermal expansion of the valve 26'. The seal 36' is produced from an elastomer material having a coefficient of thermal expansion greater than the at least one neck portion 18' and the valve 26'. Accordingly, when the interior 27' of the pressure vessel 10' is subjected to at least one of temperatures below the predetermined temperature and pressures below the predetermined pressure as shown in FIG. 3, the seal 36' is caused to contract more than the liner 14' and the valve 26'. The contraction of the seal 36' causes the inner surface 66 to abut the annual shoulder 22' of the liner 14' and the annular shoulder 61 of the valve 26', causing the lip 80 to extend therebetween and into the gap K. Therefore, the first inner sealing surface 82 sealingly abuts the annular shoulder 22' of the liner 14' and the second inner sealing surface 84 sealingly abuts the annular shoulder 61 of the valve 26', militating against the leakage of fluid from the pressure vessel 10'.

When the interior 27' of the pressure vessel 10' is subjected to temperatures above the predetermined temperature and pressures above the predetermined pressure as shown in FIG. 4, the seal 36' is caused to expand more than the liner 14' and the valve 26'. Thus, the expansion of the seal 36' causes the first outer sealing surface 70 to sealingly abut the inner surface 60 of the second annular shoulder 58 and the second outer sealing surface 72 to sealingly abut the first annular shoulder 61 of the valve 26', militating against the leakage of fluid from the pressure vessel 10'.

When the first annular shoulder 22' of the liner 14' includes the annular array of bores 59 formed therein, additional pressure from the interior 27' of the vessel 10' is permitted to be exerted on the seal 36'. The additional pressure further causes the outer sealing surfaces 70, 72 to abut inner surface 60 of the annular shoulder 58 and the annular shoulder 61 of the valve 26', respectively. Additionally, when the inner surface 60 of the second annular shoulder 58 slopes inwardly from the valve 26' to the first annular shoulder 22' of the liner 14', the seal 36' is further enabled to abut the inner surface 60 and the annular shoulder 61.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A sealing system comprising:
a male member disposed in a female member, the female member including an annular shoulder formed on an inner surface thereof, wherein the annular shoulder includes at least one bore formed therethrough; and
a seal disposed between the male member and the female member, the seal further comprising:
a substantially ring-shaped main body having a first inner sealing surface and a second inner sealing surface, wherein the inner sealing surfaces form a substantially fluid-tight seal in response to at least one of temperatures below a predetermined temperature and pressures below a predetermined pressure, the main body further including a first outer sealing surface and a second outer sealing surface, wherein the outer sealing surfaces form a substantially fluid-tight seal in response to at least one of temperatures above the predetermined temperature and pressures above the predetermined pressure; and
a lip formed on the main body extending radially inwardly to separate the first inner sealing surface and the second inner sealing surface in response to at least one of temperatures below the predetermined temperature and pressures below the predetermined pressure.

2. The sealing system according to claim 1, wherein the main body has a substantially L-shaped cross-section.

3. The sealing system according to claim 1, wherein the main body has a substantially rectangular cross-sectional shape.

4. The sealing system according to claim 1, wherein the predetermined temperature is in a range of −85 degrees Celsius to 85 degrees Celsius and the predetermined pressure ranges from a minimum service pressure to a proof pressure including a burst pressure.

5. The sealing system according to claim 1, wherein the female member is a liner of a pressure vessel.

6. The sealing system according to claim 1, wherein the male member is a portion of a valve.

7. A sealing system comprising:
a female member including an annular shoulder formed on an inner surface thereof, wherein the annular shoulder includes at least one bore formed therethrough;
a male member disposed in the female member; and
a seal disposed in the annular shoulder of the female member between the female member and the male member, the seal further comprising:
a substantially ring-shaped main body including a first inner sealing surface and a second inner sealing surface, wherein the first inner sealing surface is adapted to abut the annular shoulder of the female member in response to at least one of temperatures below a predetermined temperature and pressures below a predetermined pressure to form a substantially fluid-tight seal therebetween and the second inner sealing surface is adapted to abut the male member in response to at least one of temperatures below the predetermined temperature and pressures below the predetermined pressure to form a substantially fluid-tight seal therebetween, the main body further including a first outer sealing surface and a second outer sealing surface, wherein the first outer sealing surface is adapted to abut the inner surface of the female member in response to at least one of temperatures above the predetermined temperature and pressures above the predetermined pressure to form a substantially fluid-tight seal therebetween and the second outer sealing surface is adapted to abut the male member in response to at least one of temperatures above the predetermined temperature and pressures above the predetermined pressure to form a substantially fluid-tight seal therebetween; and
a lip formed on the main body extending radially inwardly to separate the first inner sealing surface and the second inner sealing surface in response to at least one of temperatures below the predetermined temperature and pressures below the predetermined pressure.

8. The sealing system according to claim 7, wherein the main body has a substantially L-shaped cross-section.

9. The sealing system according to claim 7, wherein the main body has a substantially rectangular cross-sectional shape.

10. The sealing system according to claim 7, wherein the predetermined temperature is in a range of −85 degrees Celsius to 85 degrees Celsius and the predetermined pressure ranges from a minimum service pressure to a proof pressure including a burst pressure.

11. The sealing system according to claim 7, wherein the female member is a liner of a pressure vessel.

12. The sealing system according to claim 7, wherein the male member is a portion of a valve.

13. The sealing system according to claim 1, wherein the annular shoulder includes an annular array of bores formed therein.

14. The sealing system according to claim 1, further comprising a second annular shoulder.

15. The sealing system according to claim 14, wherein the second annular shoulder includes an inwardly sloped inner surface.

16. The sealing system according to claim 7, wherein the annular shoulder includes an annular array of bores formed therein.

17. The sealing system according to claim 7, further comprising a second annular shoulder.

18. The sealing system according to claim 17, wherein the second annular shoulder includes an inwardly sloped inner surface.

* * * * *